US005764820A

United States Patent [19]

De Dobbelaere et al.

[11] Patent Number: 5,764,820

[45] Date of Patent: Jun. 9, 1998

[54] METHOD OF FORMING INTEGRATED ELECTRO-OPTICAL DEVICE CONTAINING POLYMERIC WAVEGUIDE AND SEMICONDUCTOR

[75] Inventors: Peter M. C. De Dobbelaere, Adegem; Peter P. van Daele, Aalst, both of Belgium

[73] Assignee: Akzo Nobel NV, Arnhem, Netherlands

[21] Appl. No.: 214,729

[22] Filed: Mar. 17, 1994

[30] Foreign Application Priority Data

Mar. 19, 1993 [NL] Netherlands .......................... 9300488

[51] Int. Cl.$^{6}$ .......................... G02B 6/12

[52] U.S. Cl. .......................... 385/14; 385/130

[58] Field of Search .......................... 385/49, 122, 130, 385/131, 14

[56] References Cited

U.S. PATENT DOCUMENTS

| | | | |
|---|---|---|---|
| 4,360,921 | 11/1982 | Scifres et al. | 385/14 |
| 4,464,762 | 8/1984 | Furuya | 385/131 |
| 4,755,015 | 7/1988 | Uno et al. | 385/131 |
| 4,795,664 | 1/1989 | De Martino | 428/1 |
| 4,820,655 | 4/1989 | Noda et al. | 385/131 |
| 4,867,540 | 9/1989 | De Martino | 350/355 |
| 4,884,112 | 11/1989 | Lorenzo et al. | 385/14 |
| 4,887,877 | 12/1989 | Inoue et al. | 350/96.11 |
| 4,985,528 | 1/1991 | Mignani et al. | 528/59 |
| 5,122,852 | 6/1992 | Chan et al. | 357/30 |
| 5,178,978 | 1/1993 | Zanoni et al. | 430/11 |
| 5,222,162 | 6/1993 | Yap et al. | 385/14 |
| 5,222,175 | 6/1993 | Tatoh | 385/14 |
| 5,259,049 | 11/1993 | Bona et al. | 385/49 |
| 5,276,745 | 1/1994 | Revelli | 385/14 |
| 5,297,218 | 3/1994 | Hanaoke | 385/14 |
| 5,325,382 | 6/1994 | Emura et al. | 372/26 |
| 5,325,392 | 6/1994 | Tohmori et al. | 385/14 |
| 5,332,690 | 7/1994 | Cho et al. | 385/131 |

FOREIGN PATENT DOCUMENTS

| | | | |
|---|---|---|---|
| 230520 | 8/1987 | European Pat. Off. | G02B 6/10 |
| 350112 | 1/1990 | European Pat. Off. | C08G 18/67 |
| 350113 | 1/1990 | European Pat. Off. | C08G 63/68 |
| 358476 | 3/1990 | European Pat. Off. | G03F 7/00 |
| 415382 | 8/1990 | European Pat. Off. | G02B 6/12 |
| 90-02348 | 3/1990 | WIPO | G02B 6/12 |
| 91-03001 | 3/1991 | WIPO | G02F 1/35 |

OTHER PUBLICATIONS

Microelectronic Engineering 15 (Jan. 1991); Pollentier et al; Low Stress Pd/Ge-based Ohmic Contacts for GaAs Epitaziel Lift-off; pp. 153-156.

SPIE vol. 1563 Optical Enhancements to Computing Technology (Jan. 1991) 8-9.

Electronic Letters 14$^{th}$ Mar. 1991, vol. 27 No. 6, 484-486.

Proceedings Third International Conference Indium Phosphide and Related Materials (Apr. 1991) 268-271.

SPIE, vol. 1177, Integrated Optics and Optoelectronics (Jan. 1989) pp. 347-352.

Proceedings of the 15th European Conference on Optical Communication, vol. 3, pp. 58-61 (Jan. 1989).

Yi-Yan; "Integrated Optical Devices with Grafted III-V Semiconductor Layers", *SPIE vol. 1177 Integrated Optics and Optoelectronics;* pp. 347-352; Jan. 1989.

*Primary Examiner*—Rodney B. Bovernick
*Assistant Examiner*—Robert E. Wise
*Attorney, Agent, or Firm*—Richard P. Fennelly; Louis A. Morris

[57] ABSTRACT

The invention relates to a method of fabricating an electro-optical device which comprises integrating a semiconductor component with a polymeric optical waveguide component. According to the invention, a semiconductor component obtained by epitaxial lift-off (ELO) is embedded in a waveguide device which in addition to a polymeric optical waveguide structure comprises an appropriate cavity. The invention further pertains to an integrated electro-optical device attainable by means of this ELO technique. Notably, it concerns an integrated electro-optical device in which the polymeric waveguide component and the semiconductor component are integrated on a substrate made of a different material from that of the semiconductor component, preferably a material with good heat dissipation, such as silicon. Preferably, the polymeric waveguide component comprises a polymer in which waveguide channels have been provided by bleaching.

7 Claims, 5 Drawing Sheets

18 3 5 6 4 18 14 13 7

METHOD OF FORMING INTEGRATED ELECTRO-OPTICAL DEVICE CONTAINING POLYMERIC WAVEGUIDE AND SEMICONDUCTOR

BACKGROUND OF THE INVENTION

The invention pertains to a method of fabricating an electro-optical device which comprises integrating a semiconductor component with a polymeric optical waveguide component.

In such an electro-optical device the necessary light sources, such as LEDs and laser diodes, optical detectors, or semiconductor electronic integrated circuits, can be incorporated into an integrated structure containing polymers in which light is transported and, optionally, modulated. These integrated structures have a number of important applications in the field of optical interconnects, such as, in the field of optical telecommunications (e.g., external modulation of light emitted by a laser diode, routing in interconnection networks, optical amplifiers, components for wavelength division multiplexing), in high-speed inter-connections in computers (optical backplane), in optical sensors, etc., as well as being easier to use and handle than opto-electronic structures composed of separate, unintegrated components. As advantages of integrated structures may be mentioned the possibility of incorporating a wide range of functionalities into a single electro-optical device, improved efficiency in coupling light into and out of waveguides, and the fact that the known problems with regard to so-called "pigtailing" (providing a waveguide component with a section of optical fibre) can be avoided.

The integration of semiconductor components with polymeric optical waveguide components is known from a post-deadline paper by Van Daele et al. presented at the 15th European Conference on Optical Communications held in Gothenburg in September of 1989 (ECOC 89) and published in the conference proceedings. At issue here is monolithic integration, with the polymeric optical waveguide component being disposed on a semiconductor substrate which is part of the semiconductor structure in which the semiconductor component is fabricated. In itself, this is the method which the person of ordinary skill in the art will make use of first. However, there are some drawbacks to this method, notably, its fairly complex nature, which seems little suited to use on a commercial scale. Moreover, the requirement of using semiconductor substrates imposes unacceptable restrictions on the electro-optical device to be manufactured, such as, as regards size, sturdiness, and cost price.

In EP 230,520 an optical element integrated optical waveguide is disclosed which comprises a polymeric supporting member which has at least one bore along its entire length, at least one optical waveguide part consisting of an organic siloxane polymer filling at least one bore, and at least one optical element, such as a light emitting diode (LED), embedded in the optical waveguide part. As regards integration of the optical element with the waveguide part, EP 230,520 mainly teaches inserting the element in a tube. An embodiment in which the optical element is placed on a substrate is also described. The element in that case is stated to be grown on the substrate, i.e., there is monolithic integration such as referred to above. Besides, EP 230,520 does not address the problem of how to obtain an integrated electro-optical device which is provided with electric contacts.

Optical elements have also been integrated with glass waveguides. Thus, in EP 415,382 a method is disclosed which comprises providing a glass substrate containing waveguides, etching a groove in the substrate adjacent to a waveguide, positioning and holding an electro-optical element in the desired position vis-a-vis the waveguide, and potting the element in the groove using a hardening material.

It is also known to integrate semiconductor components with other functional components based on inorganic materials, such as waveguides in lithium niobate. For instance, a known method, the epitaxial lift-off (ELO) technique, was described by Yi-Yan et al. in SPIE, Vol. 1177: *Integrated Optics and Optoelectronics* (1989), pp. 347–352 and U.S. Pat. No. 5,122,852. This technique involves forming a semiconductor component on a semiconductor substrate (by means of epitaxial growth), releasing the component from the substrate, and then transferring it to a guest substrate. The ELO technique, as described above, serves to integrate components of various inorganic materials on a single semiconductor chip. At issue, as inorganic materials, in particular, are glass, electro-optical crystals, such as $LiNbO_3$, and semiconductors. ELO is also known from I.

Pollentier et al., "Fabrication of Long Wavelength OEICs Using GaAs on InP Epitaxial Lift-Off Technology", *Proceedings Third International Conference Indium Phosphide and Related Materials*, (Cardiff, UK, 8–11 Apr. 1991), pp 268–271.

Generally speaking, methods from semiconductor technology which are known to be applied to inorganic materials cannot necessarily be used on organic polymers. This is because the processing of organic polymers is attended with problems quite in a class of their own, which have to do with properties such as a coefficient of thermal expansion which is generally high as compared with inorganic materials, low thermal conductance, difficult adhesion to other types of materials (e.g., inorganic ones), which may give rise to delamination, high ductility, which makes it difficult to obtain smooth facets on cleaving, and limited resistance to the solvents usually employed in semiconductor technology. However, it is greatly desired to utilize the major opportunities and suitable properties of organic polymers in the field of electro-optical applications.

SUMMARY OF THE INVENTION

The invention has for its object to integrate semiconductor components with polymeric optical waveguide components in such a way as to obviate the drawbacks to the aforementioned known monolithic integration without being hindered by the typical problems underlying the processing of organic polymers in semiconductor technology mentioned hereinbefore. Further, it is envisaged to provide a method on the basis of which a light source composed of a semiconductor (laser diode, light emitting diode) and a polymeric optical waveguide component can be so integrated that the high degree of (lateral and transversal) alignment accuracy required for efficiently coupling in light is obtained.

To this end, the invention may be characterized that, in a process integrating a semiconductor component with a polymeric optical waveguide component, a semiconductor component obtained by means of epitaxial lift-off is embedded in a waveguide device which, in addition to a polymeric optical waveguide structure, comprises an appropriate cavity.

In addition to the advantage provided by the method itself, there is another advantage to using the epitaxial lift-off (ELO) technique in combination with polymeric optical waveguides. Devices which have integrated optical energy generating semiconductor components and polymeric optical waveguides may suffer the defect of insufficient discharge of the released heat (especially in the case of continuous operation of the semiconductor component) to prevent an unacceptably high thermal load on the polymer (generating flow, phase transition, or possible degradation) and on the semiconductor component (which in the case of, for example, a laser diode may lead to, for example, a higher threshold current, a shorter life, a lower light output, and thermal shift of lasing wavelength). The method according to the present invention obviates this defect: the use of the ELO technique allows a virtually unrestricted choice of substrate, making it possible to employ a substrate exhibiting good thermal conduction. In this connection, preference is given to a substrate made of silicon.

Another advantage of the method according to the present invention, as regards application to polymers, resides in that the ELO technique does not require that the waveguide be heated. This is a significant advantage, given that, depending on the relevant transition temperatures of the polymer in question, heating can damage a polymer beyond repair. Moreover, when using polymers having electro-optical properties (NLO polymers), heating may negate these properties wholly or in part. In addition, it is quite feasible to so interadapt the dimensions of the cavity, the waveguide component, and the semiconductor component without undue experimentation, that the precision with which the semiconductor component is arranged in the cavity is sufficient for proper alignment. To this end, use will generally be made of semiconductor components and waveguide components of fixed shape and size, with the shape and size of the cavity being determined accordingly. Besides, it is possible to obtain a flat structure (neither the waveguide component nor the semiconductor component needs to protrude), which opens up opportunities for integration with other functional components.

The method according to the present invention has an additional advantage in that it readily allows waveguide patterns to be created in the appropriate polymeric materials after the semiconductor component's arrangement in the polymeric optical waveguide device. In this way, any alignment problems that may occur when transplanting the semiconductor component are substantially reduced, since the alignment is now determined by the creation of the waveguide pattern. Waveguide patterns can be created in appropriate polymeric materials via accurate lithographic or photolithographic processes.

A further advantage of using ELO is that it allows integration on large substrates (as opposed to monolithic integration, in which the substrate necessarily is a semiconductor material itself).

Different embodiments of the method according to the invention are illustrated below.

BRIEF DESCRIPTION OF THE DRAWINGS

The present invention is further illustrated by the Drawings which form a portion of the instant specification wherein.

DESCRIPTION OF THE PREFERRED EMBODIMENTS

Figure 1:
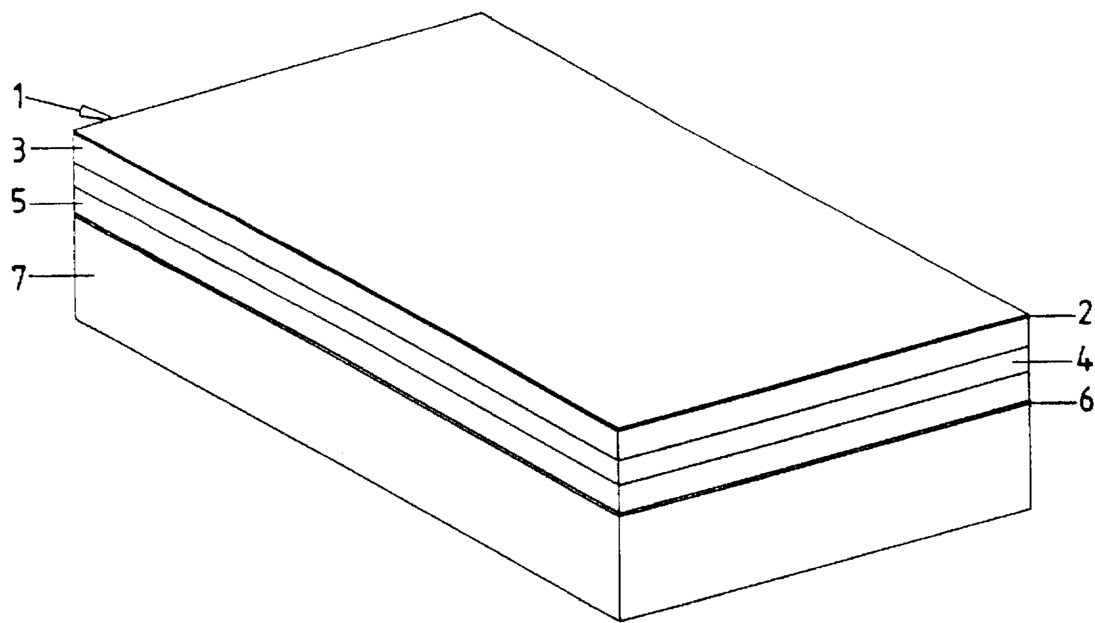
FIG. 1 is a perspective view showing an optoboard, prepared as described in Example 3, below, which has been built up of the following consecutive layers: top gold layer; top deflection layer; core layer; bottom deflection layer; bottom metallization layer; and silicon wafer substrate.

In addition to an appropriate cavity for the arrangement of the semiconductor component, the waveguide device comprises a polymeric optical waveguide structure. As a rule, such a structure comprises one or more layers of polymeric material disposed on an appropriate support (substrate), usually a bottom deflection layer, a core layer, and a top deflection layer. This waveguide structure may be a complete waveguide component. Alternatively, the structure may be incomplete, e.g., comprising just a bottom deflection layer and a core layer. In such a case a top deflection layer is generally provided after the semiconductor component has been arranged in the cavity. It is possible, and because of the sturdiness of the integrated electro-optical device it is often desired, to so provide the top deflection layer (or a further polymeric cover layer) as to also cover the semiconductor component embedded in the cavity.

The polymeric material may be coated onto a substrate in the form of, for example, a polymer solution, preferably by means of spincoating and then evaporating the solvent. Depending on the nature of the polymer, it may also be shaped by means of molding, injection molding, or other known processing techniques.

The suitable substrates include silicon wafers or synthetic laminates, e.g., those based on epoxy resin which may be reinforced or non-reinforced. Suitable substrates are known to the skilled person. The substrate is not essential to practicing the method according to the present invention.

Alternatively, the polymeric optical waveguide device may be made of a thermosetting polymeric material. In that case, having a separate substrate may be omitted, if so desired, with the polymeric material serving as substrate for the electro-optical device according to the invention.

Within the framework of the present invention the term "cavity" is to be interpreted broadly, serving as it does to indicate every conceivable suitable place cleared in relation to the polymeric waveguide component and in, or onto which, the semiconductor component may be arranged. Thus, it is possible according to the present invention to provide a substrate which is only partially equipped with a polymeric optical waveguide. The free portion of the substrate in that case may be used for arranging the semiconductor component. Also, it is conceivable to make use of a polymeric optical waveguide, either self-supporting or not or disposed on a substrate, which already contains a cavity (e.g., made by means of injection molding) to incorporate the semiconductor component. Alternatively, a cavity may be made in a polymeric optical waveguide disposed on a substrate or not (e.g., by means of wet-chemical or dry etching techniques), to incorporate the semiconductor component.

It should be noted that in the case of a polymeric optical waveguide structure, it is also possible to use polymeric material (or material to be polymerized) which does not yet have a defined waveguide structure but on the basis of which a waveguide may be later defined (e.g., by the provision of additional polymeric layers or by partial chemical or physical modification of the material such as to form a waveguide structure).

According to the present invention, it is preferred to make use of a polymeric optical waveguide structure disposed on a substrate, preferably a silicon substrate, and to remove part of the polymeric material right down to the substrate. Depending on the ultimately desired configuration of the electro-optical device, the polymeric material is removed either at the edge of the substrate (so as to incorporate the semiconductor component into the electro-optical device adjacent to the waveguide material) or at its center (so as to incorporate the semiconductor component at the center of the waveguide material). In the latter configuration, it is possible to make good use of the light emitted by the two facets of the light source, or of the fact that the light emitted from the two facets is mutually coherent.

With regard to the term "embedding," it should be stated that this refers to so arranging the semiconductor component so that it abuts the polymeric waveguide on at least one side thereof. Of course, the semiconductor component may abut the waveguide on several sides both laterally and vertically, e.g., be provided with polymeric material (which may be identical with the upper deflection layer of the polymeric optical waveguide) also on its upper surface.

The polymeric material may be removed by means of any appropriate etching technique, e.g., those known from the production of integrated circuits (ICs). Applicable in this case are wet-chemical etching techniques, e.g., with use being made of organic solvents or strong bases. However, preference is given to dry etching techniques, such as sputter etching, reactive ion etching, or reactive plasma etching. Such techniques are known to the skilled person and require no further elucidation here. Alternatively, there may be etching using a laser, mechanical etching such as grinding, cutting, drilling, or etching through bombardment with sanding particles such as alumina, silica, and, more particularly, pumice. The preferred etching technique is dependent on the polymer employed. The skilled person is expected to be able to select an appropriate etchant for the polymer in question without undue experimentation. Preferably, use is made of reactive ion etching (RIE) or a combination of RIE and reactive plasma etching, while so-called laser ablation is another very suitable technique.

It is of particular relevance that the polymeric material be so removed by etching as to give a smooth facet. Furthermore, the surface subjected to etching should not exhibit any foreign substances or roughnesses. Preferably, the facet is substantially vertical, because, in that case, the entire semiconductor component may be abutted on the waveguide, so giving the most efficient coupling in of light. Even when it is not possible to abut the entire semiconductor component on the waveguide, e.g., when the facet is not completely vertical, efficient coupling may be obtained according to the present invention, notably when a (preferably low viscous) filler is added to prevent an air gap between the semiconductor component and the waveguide component. In this way, providing the optical properties of the filler do not differ markedly from those of the polymer, an inconvenient refractive index contrast in relation to an air gap may be avoided. Preferably the filler selected has the same, or virtually the same, refractive index as the core layer of the polymeric waveguide. Thus, the polymer itself can very well be used as a filler, either in the form of a solution or (in the case of a thermoset) in the uncured state. Alternatively, use may be made of oligomers analogous to the polymer, a glue, or some other adhesive. Suitable adhesives are, for instance, the glues of the well-known cyanoacrylate type.

To remove the desired portion of the polymer when using non-mechanical etching techniques, a mask is applied to cover those parts which should remain free from attack by the etchant. These masks, the chief prerequisite of which is that they be resistant to the action of the etchant, are known, for example, from IC technology. Such a mask may be preformed and made up of, for example, metal or synthetic material. Alternatively, it can be made by applying a photosensitive resin (photoresist) and subsequently exposing and developing said resin in accordance with the desired pattern.

Devices comprising a semiconductor component and a polymeric optical waveguide component frequently are provided with a bottom metallization, preferably of gold. This metallization should be applied before the entire waveguide structure is produced. The bottom metallization can be of considerable advantage if the same metal is also used as an etching mask for making the cavity. Since such a metal layer will not be removed by the etchant, it will protect the bottom of the cavity against contact with the etchant, and thus safeguard that a cavity is produced having a smooth bottom surface, since only after etching the cavity are the metal mask and the bottom metal layer removed. During this step dust particles or remnants of the waveguide etching process are also easily removed.

Alternatively, it is possible to provide a cavity in the polymeric material without removing any material, e.g., by means of embossing. This technique is attended either with heightening beside the cavity or with increased density of the material tamped down in the cavity. The former is less recommended if an already formed waveguide layer structure is employed, since the change occurring in the vertical direction will impede alignment of the waveguide and the semiconductor component. The polymeric optical waveguide components to be used according to the present invention are usually composed of a core layer enclosed by two deflection layers having a lower refractive index. The shape of the waveguide component generally is dependent on the function of the device into which it is incorporated. The most common waveguide components are flat waveguides which may be provided with waveguide channels or not, ribbed waveguides, or inverted ribbed waveguides. In these, functional structures such as modulators, switches, wavelength selective structures, optical amplifiers, etc. may already be disposed.

In the process according to the present invention it is preferred to make use of a slab (flat) waveguide, i.e., a waveguide generally made up of a flat core layer enclosed by a flat bottom deflection layer and a flat top deflection layer. Such a design offers the best opportunities for providing a cavity in such a way as will permit embedding of the semiconductor component with any significant alignment problems.

Also when a slab waveguide is employed it is generally advisable to attain a lateral waveguide pattern as well. Methods of achieving this are known. For instance, such patterns may be provided by removing portions of the flat waveguide, e.g., by means of wet-chemical or dry etching techniques, and filling the formed voids with a material having a lower index of refraction (thus forming a channel of core layer material enclosed on all sides by deflection layer material). Alternatively, it is possible to use photosensitive material, which can be developed after irradiation; for instance, a negative photoresist, that is to say, material which is resistant to a particular solvent (developer) after being irradiated. The developer in that case may be used to remove non-irradiated material. However, it is preferred to employ a positive photoresist and have the developer remove the portion that has been irradiated.

The preferred technique, however, involves making use of a core material in which a waveguide pattern can be provided without any material being removed by etching. For instance, there is core material which is chemically converted into a material with a different index of refraction under the influence of heat, light or UV irradiation. If this concerns an increase in the index of refraction, the treated material will be used as core material. This may take the form of carrying out the treatment using a mask, with the holes in the mask being identical with the desired waveguide pattern. If, on the other hand, a reduction of the index of refraction is involved, the treated material will be suited for use as deflection material. The treatment in question in that case may be carried out using a mask of which the closed portions are identical with the desired waveguide pattern.

In the process according to the present invention it is preferred to employ a flat waveguide of which the core layer comprises a polymer bleachable under the influence of irradiation. This is a particular type of light- or UV-sensitive core layer material. Probably because of a chemical rearrangement reaction, irradiation, preferably generally using blue light, lowers the index of refraction of such a material without affecting the remaining physical and mechanical properties. Preferably, the flat waveguide is provided with a mask covering the desired pattern of channels, so that the surrounding material can have its index of refraction lowered ("be bleached") by means of irradiation. Thus, as desired, waveguide channels are formed which are enclosed on all sides by material having a lower index of refraction (the bottom and top deflection layers and the surrounding bleached core layer material). Such bleachable polymers have been described in U.S. Pat. No. 5,142,605.

The present invention provides electro-optical devices in which the polymeric optical waveguide component has a passive function (conveyance of light) as well as electro-optical devices comprising active waveguides. Active waveguide components can also be used to modulate the light, and the electro-optical device may be used as, say, a switch. The advantage of such a device is that it permits continuous operation of the semiconductor component (usually a laser diode). The advantage of this, in addition to more rapid modulation, is that the semiconductor component can be integrated with a directional coupler. The result of such integration is a basic component for using coherent optical detection and for applications such as routing in optical networks.

It can be added that the modulation of a semiconductor component (e.g., a laser diode) through a separate modulator (e.g., a Mach-Zehnder interferometer), i.e., external modulation, has several advantages over modulating the electrical current by which the semiconductor component is operated, i.e., direct modulation. These advantages include chirp-free working, a high modulation speed, and a large dynamic range. The drawbacks to using an external modulator as compared with direct modulation, which include difficult packaging and the occurrence of coupling losses, are avoided in the integrated devices provided by the instant invention.

The principal requirement made of the core layer for a passive optical component is that it display minimal optical losses for the desired wavelength and, of course, have a higher index of refraction than the deflection layers. The most important wavelength ranges in actual practice are approximately 670 nm, from about 800 to about 1000 nm, approximately 1300 nm, and approximately 1500 nm. These last two wavelength ranges are especially suited for use in long-distance telecommunications. The suitable polymeric materials for passive waveguides are known to the skilled person. Further, it is of importance for the core and deflection layers to be easy to treat and so processable as to give the flattest and purest possible contact surfaces between the core and deflection layers as well as sufficient adhesion between the core and deflection layers. The skilled person will know which materials to select to this end. Preferably, use is made of materials in which waveguide channels can be made by means of irradiation, as described above.

In active waveguides use is made of polymers having a non-linear optical activity macroscopically effected therein by means of alignment. In optically non-linear materials, which are also known as non-linear optical (NLO) materials, non-linear polarization occurs under the influence of an external field of force (such as an electric field). Non-linear electric polarization may give rise to a number of optically non-linear phenomena, e.g., the electro-optical (Pockels) effect. In electro-optical (e/o) components electric voltage is used to effect a change in waveguide behavior. In this connection may be mentioned an electro-optical switch or an electro-optical Mach-Zehnder interferometer. Rendering NLO materials NLO-active (i.e., macroscopically achieving the desired NLO effect) involves, first of all, aligning (poling) the groups present in such a material, which usually are hyperpolarizable side-groups. Such poling generally takes the form of exposing the polymeric material to electric voltage, the so-called poling field, with such heating as will render the polymer chains sufficiently mobile for alignment.

Such NLO-active materials (NLO polymers) have also been described in U.S. Pat. No. 5,142,605 and in, e.g., U.S. Pat. Nos. 5,001,209, 4,959,448, 4,985,528, 4,867,540, 4,795,664, and WO 91/03001. For that matter, these materials are also suitable for use in passive waveguides. The type of semiconductor employed is not crucial to the process according to the present invention. In general, serviceable components are based on III–V materials such as gallium arsenide and indium phosphide. The principal semiconductor components according to the invention are light sources composed of III–V semiconductors such as laser diodes (LD) and light emitting diodes (LED), these being the most efficient light sources in opto-electronics at the moment, control circuits, amplifiers, and detectors, e.g., those operating via evanescent field coupling and those which operate via butt coupling and, analogous to the light source, are positioned abutting the waveguide component. Possible semiconductor components include transistors such as MESFETs (metal semiconductor field effect transistors), HEMTs (high electron mobility transistors), and HJBTs (heterojunction bipolar transistors).

The manufacture of semiconductor components and the use of epitaxial lift-off (ELO) are known, e.g., from the aforementioned publications by Yi Yan and from Yablonovitch, *Proc. SPIE Int. Soc. Opt. Eng.* 8–9 (1991), 1563, Pollentier et al., *Microelectron. Eng.* 15(1–4) (1991), 153–6, Tsao et al., *Electron. Lett.* 27(6), 484–6.

Generally speaking, the ELO technique comprises transplanting thin semiconductor films (preferably about 0.1–10 μm) onto a new (flat) substrate. Because the use of etchants based on hydrogen fluoride (HF) readily permits selective etching of AlAs vis-a-vis $Al_xGa_{x-1}As$ (with x=<0.4), the technique was found to be most successful in a GaAs-AlGaAs-InGaAs system. This may be put to good use by providing an AlAs layer between the substrate and the semiconductor component when growing the semiconductor component on the semiconductor substrate (mother substrate). By selectively removing this AlAs layer by etching, full lift-off of the semiconductor component from the substrate is achieved in a comparatively simple manner.

When using the ELO technique it is preferred to coat the semiconductor with a layer of wax, preferably Apiezon W type wax manufactured by Apiezon Products Ltd. This wax layer serves not only to provide a certain measure of mechanical support and protection for the lifted off ELO layer but also provides the advantage that, on account of the compressive forces contained in the wax layer, during its lift-off the ELO layer is pulled away somewhat from the original semiconductor substrate, thus enabling better feeding and discharge of reagents and reaction products.

Selective lift-off of various semiconductor components from the mother substrate can be attained by, e.g., completely covering part of the mother substrate with wax and then cleaving it to form several semiconductor components. However, since the wax generally is not transparent, it is preferred to first isolate several semiconductor components on the mother substrate. This may be done by etching moats of several micrometers in depth at the edges of the desired semiconductor components, e.g., by means of $SiCl_4$ RIE (Reactive Ion Etching). In the aforementioned GaAs-AlGas-InGaAs system, where an AlAs layer is used to obtain the ELO layer, care must be taken to see to it that these moats penetrate into the AlAs layer. On the semiconductor components isolated in this way molten wax is then deposited (e.g., with the aid of a heated syringe). Next, the substrate is heated to above the wax's melting temperature to have it flow across the entire substrate. The wax's surface tension, however, ensures that it will not continue its flow all the way into the moats. Consequently, the exposed AlAs layer is not covered, allowing the lift-off of the ELO layer while forming several semiconductor components to proceed without hindrance.

After application of the wax layer, the semiconductor components may be introduced into an etching mixture. In the aforementioned system this preferably is a 1:5 mixture of HF and de-ionized water, preferably This temperature of 0° C. This treatment preferably lasts for several hours. The period of time over which the AlAs is wholly removed by etching is of course dependent on the surface area of the ELO layer to be lifted off. As a representative etching rate value may be mentioned approximately 2 μm/min. It was found to be most advantageous not to take the semiconductor components removed by etching from the water and to carry out the transplantation to the guest substrate under water. It was found that in this way the appearance of dust particles between the ELO layer (the semiconductor component removed by etching) and the guest substrate can easily be precluded, and cracks and roughnesses in the ELO film can be avoided. Any roughness is, of course, objectionable in view of the desired adhesion to the guest substrate, preferably through Van der Waals bonding.

Next, the ELO film may be placed in the cavity made in the waveguide device. In the case of underwater processing, the water level is reduced and the structure provided with a semiconductor component and a polymeric optical waveguide component is taken from the water in its entirety. Preferably, the structure is then subjected to compressive pressure for several hours, about twenty-four hours for preference, in order to ensure proper Van der Waals bonding between the guest substrate and the semiconductor component during drying, to give permanent adhesion. Alternatively, however, the desired adhesion may be effected by applying an adhesive to the guest substrate, for instance a cyanoacrylate glue.

Finally, the wax is washed away, e.g., with the aid of trichloroethylene. Of course, in that case conditions must prevail such as will ensure that the polymeric material is not attacked. To this end, generally, the wax must be washed away sufficiently quickly. In actual practice, it proved very well possible to do so in under a minute (e.g., forty seconds), which period of time is short enough to prevent the polymeric waveguide from being attacked.

Utilizing a photoresist layer instead of the layer of wax has also been found to give good results. An example of a suitable photoresist is Shipley's 1450 J resist. It is used in the form of a relatively thick layer (200 μm–300 μm). When subjected to UV irradiation, this positive photoresist can be developed using an aqueous KOH solution. This is advantageous in that organic solvents can be avoided.

Also, it is possible to remove the photoresist using acetone or $O_2$ plasma.

Depending on the application, it may be preferable for the semiconductor component to be embedded to comprise a monolithic array of semiconductor components. For not only is the semiconductor component generally made in such a form, it is usually also advisable to simultaneously incorporate a number of semiconductor components into the electro-optical device. Depending on the function of the electro-optical device, the polymeric optical waveguide may comprise a number of individual waveguide components (e.g., in the case of an array of waveguide modulators being integrated with a monolithic array of semiconductor laser diodes), or of a waveguide component integrated in its entirety with the individual waveguide components (e.g., in the case of an Erbium-doped waveguide being integrated with an array of semiconductor laser diodes used as pump sources for the thus realized optical amplifier).

After positioning of the semiconductor component, the polymeric optical waveguide device may be further processed in a manner known to the artisan. This concerns, for example, providing the metallization patterns necessary for electric interconnection on the semiconductor component and (especially in the case of active waveguides) on the polymeric waveguide component. It should be noted that it is also possible to provide the polymeric waveguide component with metallization patterns before the semiconductor component obtained by ELO is arranged in the waveguide device. It is of advantage to define these metallization patterns in conjunction with the definition of the mask for etching the cavity in the polymeric waveguide device.

In a preferred embodiment of the method according to the present invention there are formed a polymeric optical waveguide device comprising a flat waveguide component in which the core layer is a bleachable polymer according to U.S. Pat. No. 5,142,605, which waveguide component is disposed on a substrate with high heat dissipation (silicon), and a cavity the bottom of which is composed of this substrate. In this preferred method the semiconductor component's adhesion to the substrate is by means of Van der Waals bonding. Thus, the method according to the present invention combines a number of advantages:

Throughout the entire process the polymeric waveguide device is not exposed to temperatures of more than about 100° C., which means that there is no excessive thermal load on the polymer;

It is possible to attain a high degree of aligning accuracy:

in transversal direction: by not using a separate adhesive layer or adhesion promoting layer the often complicated setting of the thickness of such an additional layer is avoided. The alignment of the active area of the (light emitting) semiconductor component vis-a-vis the center of the core layer of the waveguide component is dependent only on the layer thicknesses in the waveguide structure;

in lateral direction: after the positioning of the semiconductor component the desired waveguide pattern can be defined photolithographically (using a well-known mask aligner);

in longitudinal direction the alignment is determined by the accuracy of the pick-and-place apparatus positioning the semiconductor component in the cavity. Properly functioning devices in this respect are known from semiconductor technology;

The final integrated electro-optical device displays good thermal properties because of the direct contact between the light source (semiconductor component) and the silicon substrate (heat sink); the flatness of the final integrated electro-optical device permits additional integrations (e.g., an integrated electro-optical device already incorporating an array of lasers and a polymeric optical waveguide component on a substrate permits the integration on that same substrate of the control circuit for the laser array with the other components).

The invention further relates to electro-optical devices which may be fabricated using the method disclosed above. More particularly, the invention relates to an integrated electro-optical device comprising a flat polymeric waveguide structure, i.e. a waveguide made up of a flat core layer enclosed by a flat bottom deflection layer and a flat top deflection layer, and a semiconductor component, characterized in that the semiconductor component is wholly embedded in the polymeric waveguide structure, i.e., enclosed by polymer on at least two sides. It should be noted that thus is indicated, in essence, a difference between an integrated electro-optical device fabricated using the known technique of monolithic integration on a semiconductor substrate and an integrated electro-optical device such as may be made according to the present invention using ELO. The invention also pertains to an integrated electro-optical device comprising a polymeric waveguide component and a semiconductor component, characterized in that the semiconductor component and the polymeric waveguide component are integrated on a substrate made of a different material from that of the semiconductor component. Again, this reflects a significant difference from the known technique of monolithic integration on a semiconductor substrate. Such an integrated electro-optical device offers the advantage of a wide selection of different types of substrate materials. Thus, if so desired, the device may be made of thermosetting NLO material or, alternatively, a substrate enabling good heat dissipation (such as silicon) may be selected.

The invention will be further elucidated with reference to the following, unlimitative examples and drawings.

EXAMPLE 1

In this Example an array of LEDs with sideways emission was integrated with a polymeric flat waveguide.

The array of LEDs was produced via epitaxial growth on an n-doped GaAs substrate. From the top downwards it contained the following layers (GRIN stands for graded refractive index layer, QW for quantum well):

GaAs contact layer, 100 nm, p-type, doping $5.10^{18}/cm^3$

GaAs→$Al_{40}Ga_{60}As$ grading, 100 nm, p-type, doping $5 \rightarrow 1.10^{18}/cm^3$ $Al_{40}Ga_{60}As$ cladding layer, 100 nm, p-type, doping $1.10^{18}/cm^3$ $Al_{40}Ga_{60}As$ cladding layer, 300 nm, p-type, doping $5.10^{16}/cm^3$ GRIN AlGaAs ($Al_{40} \rightarrow Al_{20}$), 120 nm, p-type, $5.10^{16}/cm^3$→undoped $In_{15}Ga_{85}As$ QW, active layer, 8 nm, undoped GRIN AlGaAs ($Al_{20} \rightarrow Al_{40}$), 120 nm, undoped→n-type, $5.10^{16}/cm^3$ $Al_{40}Ga_{60}As$ cladding layer, 900 nm, n-type, doping $1.10^{18}/cm^3$ $Al_{40}Ga_{60}As$ GaAs grading, 100 nm, n-type, doping $1 \rightarrow 8.10^{18}/cm^3$ GaAs buffer layer, 100 nm, n-type, doping $8.10^{18}/cm^3$ AlAs, layer to be selectively removed by etching, 20 nm, n-type GaAs buffer layer, 500 nm, n-type, doping $1.10^{18}/cm^3$ n-type GaAs substrate Use was made of a so-called "optoboard", a structure comprising a silicon support with disposed thereon a flat polymeric optical waveguide composed of the following layers:

5 metal (gold), 150 nm

4 top deflection layer, 3.15 μm

3 core layer, 1.83 μm

2 bottom deflection layer, 3.15 μm

1 silicon wafer, 3 inch (7.62 cm), 100 orientation, 3–10 Ω.cm

In order to define the position of the cavity in which to arrange the semiconductor component (LED array), a pattern was defined in metal layer 5 using a $KI/I_2$ etching mixture. This pattern served as etching mask as the cavity was etched in the polymer.

Next, a facet was etched in the polymer using an $O_2$ plasma. At the location of the cavity, layers, 4, 3, and 2 were removed altogether. The cavity was wholly adjacent to the polymeric waveguide, i.e., at issue is a polymeric optical waveguide device comprising a cavity abutting on a polymeric optical waveguide device on one side.

This may be elucidated as follows, with reference to layers 1–5 indicated above:

5555555555555555555
4444444444444444444
4444444444444444444
3333333333333333333
2222222222222222222
2222222222222222222
1111111111111111111111111111111111

The LED arrays were prepared for the ELO process: they were cleaved into strips of about 5 mm in length and widths (cavity lengths) of 500 μm and 1 mm. These strips were coated with wax (Apiezon W). The strips were heated to 120° C., causing the wax to flow and spread over the entire surface area of the strips. After cooling the strips were glued to a support of TEFLON fluoropolymer using an HF-resistant photoresist (Shipley 1350J) and then introduced into an ELO etching mixture (1 part by volume of HF (49–51 vol %) and 5 parts by volume of $H_2O$), where the AlAs layer was removed by etching. Ice was used to keep the temperature of the etching bath at 0° C.

The AlAs layer was found to have been completely removed by etching after about 8 hours, whereupon the ELO-LED structure could be taken off the original substrate. The ELO-LED was positioned in front of the facet etched in the polymer under water and then fixed in the cavity using slight pressure (some tens of gf/mm$^2$).

Next, the entire electro-optical device was lifted from the water and left to dry for one day under a press, after which the wax was washed away with the aid of 1,1,1-trichloroethylene. Because of Van der Waals bonding, the semiconductor component (ELO-LED) remained fixed in the cavity during this process.

The ELO transplantation was found to give continued good action of the LEDs, and light was successfully coupled into the polymeric flat waveguide.

EXAMPLE 2

In this Example an array of LEDs with sideways emission was integrated with a polymeric flat waveguide with the aid of an adhesive.

The same array of LEDs was fabricated as in Example 1.

In an identical optoboard a cavity was made by wholly removing deflection layer 4 and core layer 3, but only removing deflection layer 2 over part of the layer thickness in order to enable the active layer of the LED to be positioned exactly at the level of the center of core layer 3. Having reference to layers 1–5 indicated hereinbefore, the structure of the polymeric optical waveguide device comprising a cavity and a polymeric optical waveguide component may be elucidated as follows:

5555555555555555555
4444444444444444444
4444444444444444444
3333333333333333333
2222222222222222222
2222222222222222222222222222222222
1111111111111111111111111111111111

The ELO technique was implemented as in Example 1.

To attain good adhesion to polymer layer 2 instead of silicon lay 1 it is preferred to employ an glue layer rather than Van de Walls bonding. To this end, the bottom of the cavity was coated with a thin film (a few hundreds of nms) of cyanoacrylate glue prior to the semiconductor component being positioned therein.

An electro-optical component was obtained in which the semiconductor component (LED array) and the polymeric optical waveguide component (flat waveguide) were properly aligned. The LEDs were found to function properly, and light was successfully coupled into the polymeric flat waveguide component.

The Example further demonstrates that it is possible to attain good transversal alignment when making use of a separate glue layer (the thickness of the glue layer is negligible in relation to the thicknesses of the polymeric waveguide's core layer and deflection layers).

EXAMPLE 3

In this Example an array of LEDs with sideways emission was integrated with a polymeric channel waveguide array. After ELO transplantation the LED array was found to have improved into an array displaying laser action.

An LED array was fabricated in the same was as in Example 1.

For the polymeric optical waveguide device use was made of an optoboard of the following structure:

F top metallization: layer of gold, 150 nm

E top deflection layer, 3.15 μm

D core layer, 1.83 μm

C bottom deflection layer, 3.15μ

B bottom metallization: 20 nm Cr, 200 nm Au

A silicon wafer, 3 inch (7.62 cm), 100 orientation, 3–10 Ω.cm

The core layer was a UV-bleachable polymer according to U.S. Pat. No. 5,142,605.

In order to define the position of the cavity for the arrangement of the semiconductor component (LED array), a pattern was defined in the layer of gold F using a $KI/I_2$ etching mixture. Said pattern served as etching mask as the cavity was etched in the polymer.

Next, a facet was etched in the polymer using an $O_2$ plasma. At the location of the cavity, layers F, E, D, and C were removed entirely, after which layer of gold F and the exposed portion of layer of gold B were wholly removed using a $KI/I_2$ etching mixture. The entire cavity was situated adjacent to the polymeric waveguide, i.e., at issue once again is a polymeric optical waveguide device comprising a cavity abutting on a polymeric optical waveguide component on one side.

This can be further elucidated with reference to layers A–F indicated above:

EEEEEEEEEEEEEEEEEEEE
EEEEEEEEEEEEEEEEEEEE
DDDDDDDDDDDDDDDDDDD
CCCCCCCCCCCCCCCCCCCC
CCCCCCCCCCCCCCCCCCCC
BBBBBBBBBBBBBBBBBBB
AAAAAAAAAAAAAAAAAAAAAAAAAAAAAAAA

The ELO technique was implemented as in Example 1.

After the positioning of the LED array in the cavity, the desired polymeric optical waveguide component, the channel waveguide array, was defined by means of a photobleaching process using a Karl-Suss mask aligner (16¥ hours, 15 mW/cm$^2$). The planar structure of the integrated combination of LED array and flat waveguide permitted good alignment between the waveguide channels realized in this manner and the LED stripes.

I/V characteristics before and after ELO show that there was no significant change in the serial resistance of the LEDs as a result of the method employed. This means, for example, that there was no increase in the component's heat dissipation.

The optical spectrum of the fabricated structure showed that the LED structures displayed laser action: This makes it clear that the epitaxial layers retain their high quality after ELO and that, furthermore, the method according to the present invention is attended with an enhancement of the properties of the III–V light source.

In consequence, the action of the LEDs was found to be good, and light was successfully coupled into and passed through the polymeric waveguide component.

The invention is further illustrated with reference to the drawings. These drawings, which relate to the embodiment of the invention that has been described in Example 3, are presented for purposes of explanation only, and should not be considered limitative in any way.

In FIG. 1 an optoboard (1) is shown which is built up of the following consecutive layers:

(2) top metallization layer of gold (3) top deflection layer (4) core layer (5) bottom deflection layer (6) bottom metallization (not visible)

(7) silicon wafer (substrate)

Figure 2:
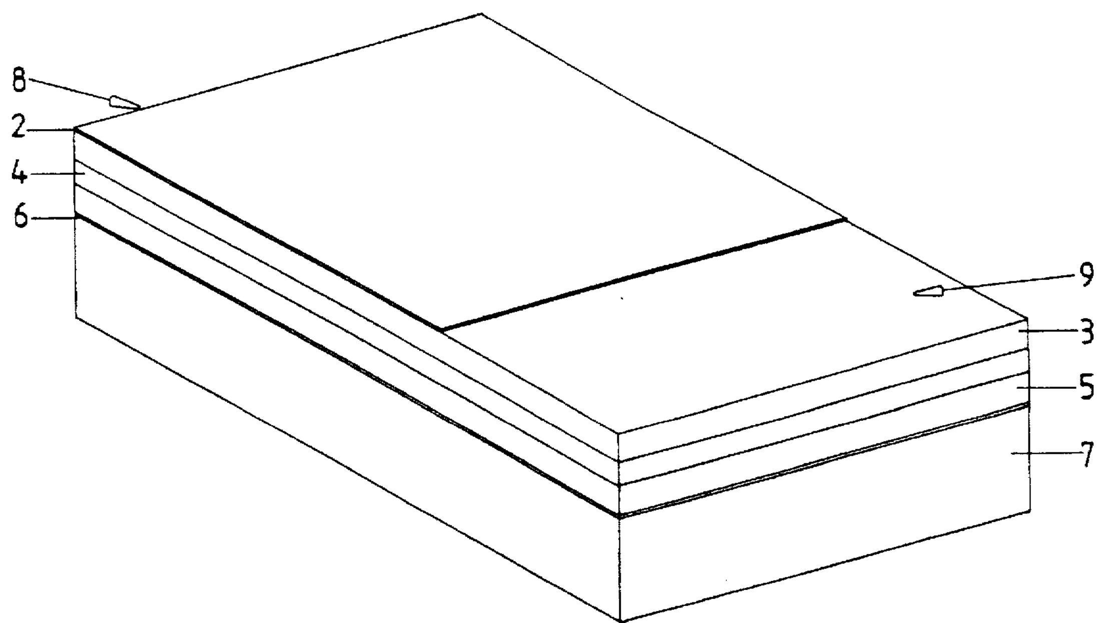
FIG. 2 is a view of an optoboard similar to the view in FIG. 1 showing that the position of the cavity for the arrangement of the semiconductor component can be determined by defining a pattern in the gold layer thereby forming an etching mask therein.

In FIG. 2 it is shown that the position of the cavity for the arrangement of the semiconductor component is determined by defining a pattern in the layer of gold (2). Thus the layer of gold (2) serves as an etching mask: one portion (8) of the layer of gold remains, and the waveguide structure below it will not be affected by the etchant, while another portion (9) has been removed, making visible the top deflection layer (3).

Figure 3:
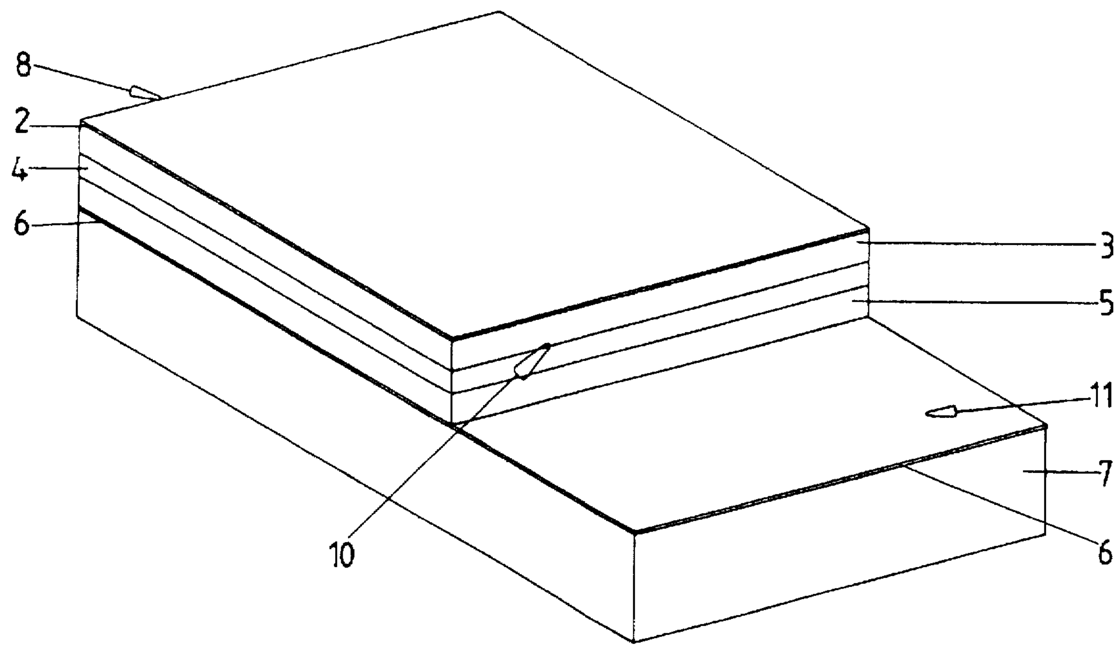
FIG. 3 is a view similar to the views of FIGS. 1 and 2 showing that a facet can be etched in the polymeric optoboard.

In FIG. 3 it is shown that a facet (10) is etched in the polymeric optoboard (1). The waveguide structure below the remaining portion of the layer of gold (8) remains unaffected, while at the position where the waveguide structure has been removed a cavity (11) results, in which only the bottom metallization (6) and the substrate (7) remain.

Figure 4:
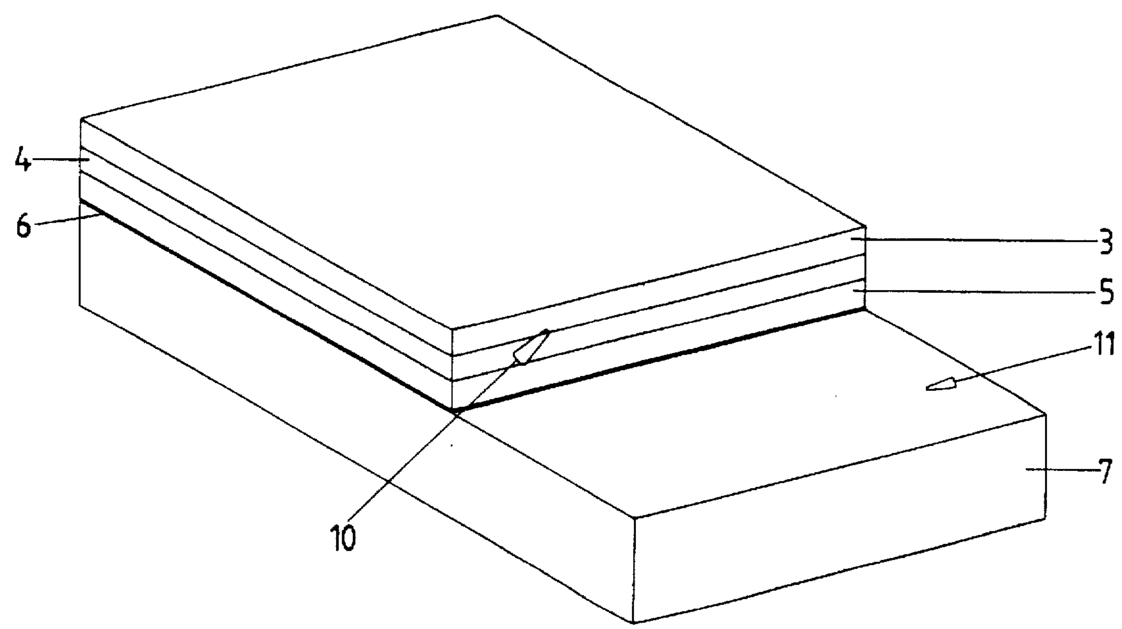
FIG. 4 is a view similar to the views of FIGS. 1–3 showing that, as compared to FIG. 3, the remaining portions of the top gold layer and the exposed portion of the bottom metallization portion have been removed.

In FIG. 4 it is shown that the remaining portion (8) of the top layer of gold and the exposed portion of the bottom metallization (6) have been removed.

Figure 5:
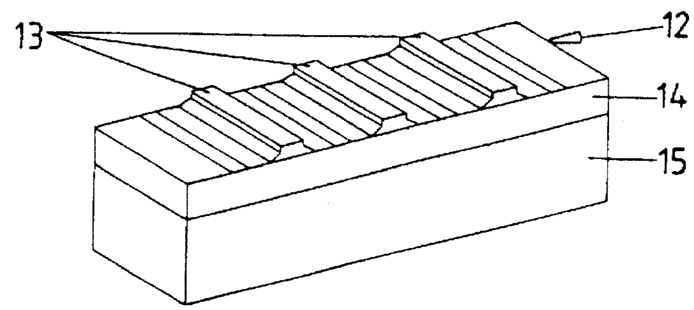
FIG. 5 is a perspective view showing an LED array strip comprising three LEDs with sideways emission prepared as in Example 1, below.

In FIG. 5 a LED array strip (12) is shown comprising three LEDs (13) with sideways emission. The LEDs consist of a stack (14) of epitaxial layers (not shown individually) on a substrate (15), as described in Example 1.

Figure 6:
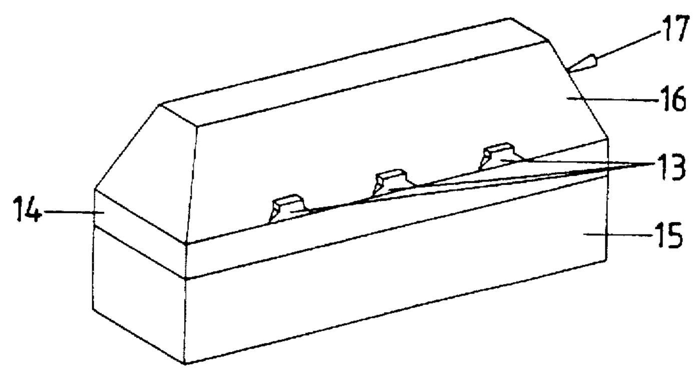
FIG. 6 is a view similar to the view in FIG. 5 showing a(n) wax-covered LED array strip prepared for the epitaxial lift-off technique.

In FIG. 6 it is shown that the LED array strip (12) has been prepared for the ELO process by coating the LEDs (13) with wax ((16).

Figure 7:
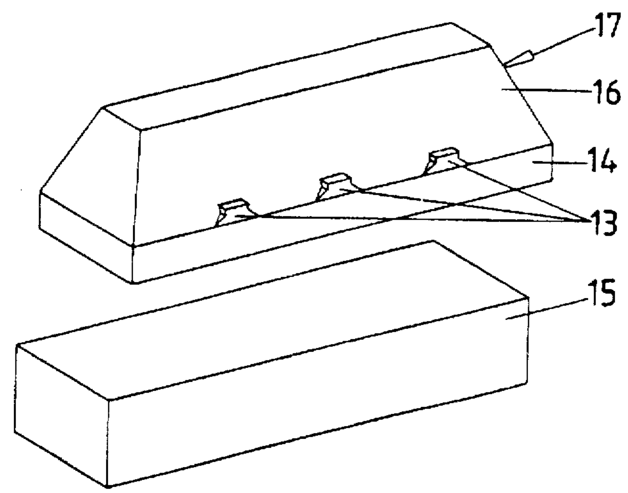
FIG. 7 is a view similar to the views of FIGS. 5 and 6 showing the LEDS covered with wax after having been lifted off from the substrate.

In FIG. 7 it is shown that a structure (17) consisting of LEDs (13) covered with wax (16) is lifted off from substrate (15).

Figure 8:
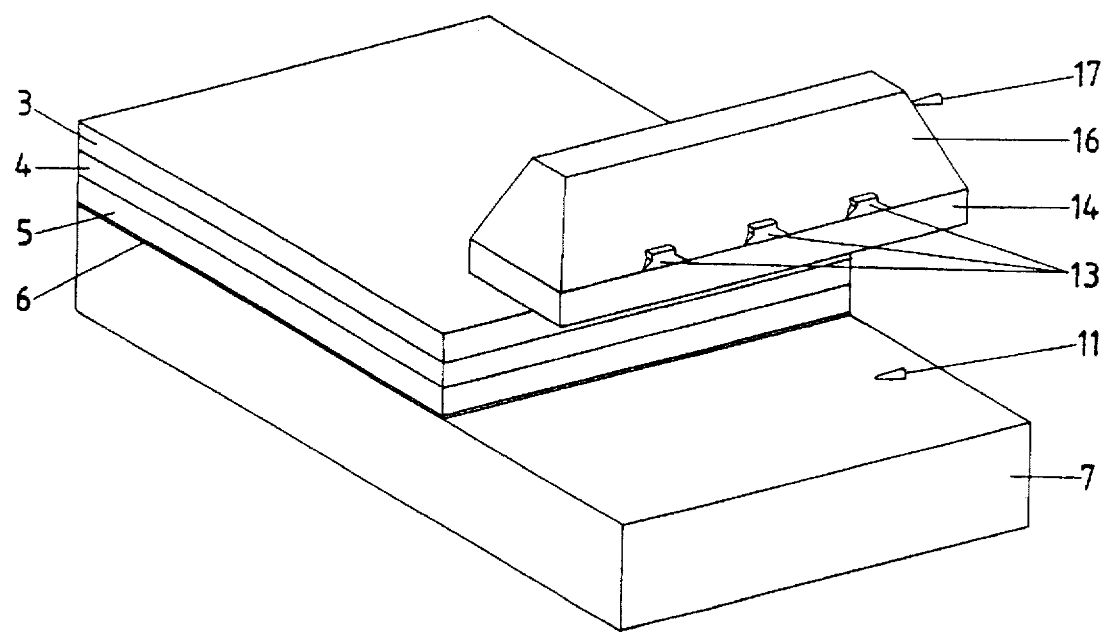
FIG. 8 is a perspective view showing the positioning of the wax-covered LEDS of FIG. 7 in relationship to the cavity of the optoboard of FIG. 4.

In FIG. 8 the positioning of the wax-covered LEDs structure (17) vis-a-vis the cavity (11) of the optoboard (1) is shown.

Figure 9:
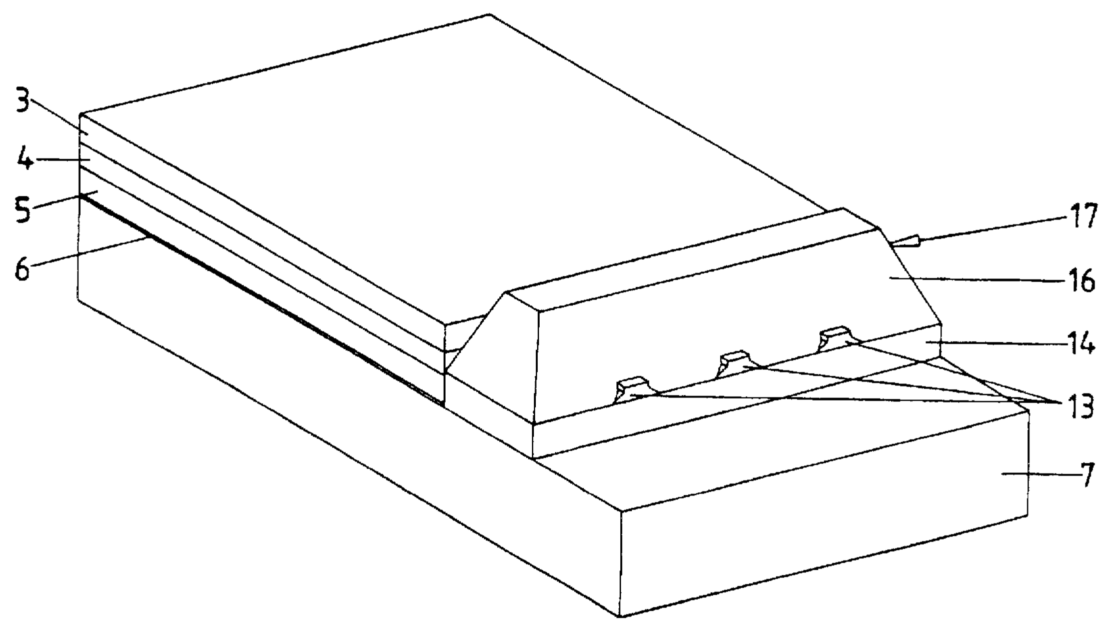
FIG. 9 is a view similar to that in FIG. 8 showing the wax-covered LEDs having been placed in the cavity of the FIG. 10 is a view similar to that in FIGS. 8–9 showing removal of the layer of wax with positioning of the LEDs so that they are in vertical alignment with the core layer of the optoboard.

In FIG. 9 it is shown that the wax-covered LEDs structure (17) has been placed in the cavity (11) of the optoboard (1).

Figure 10:
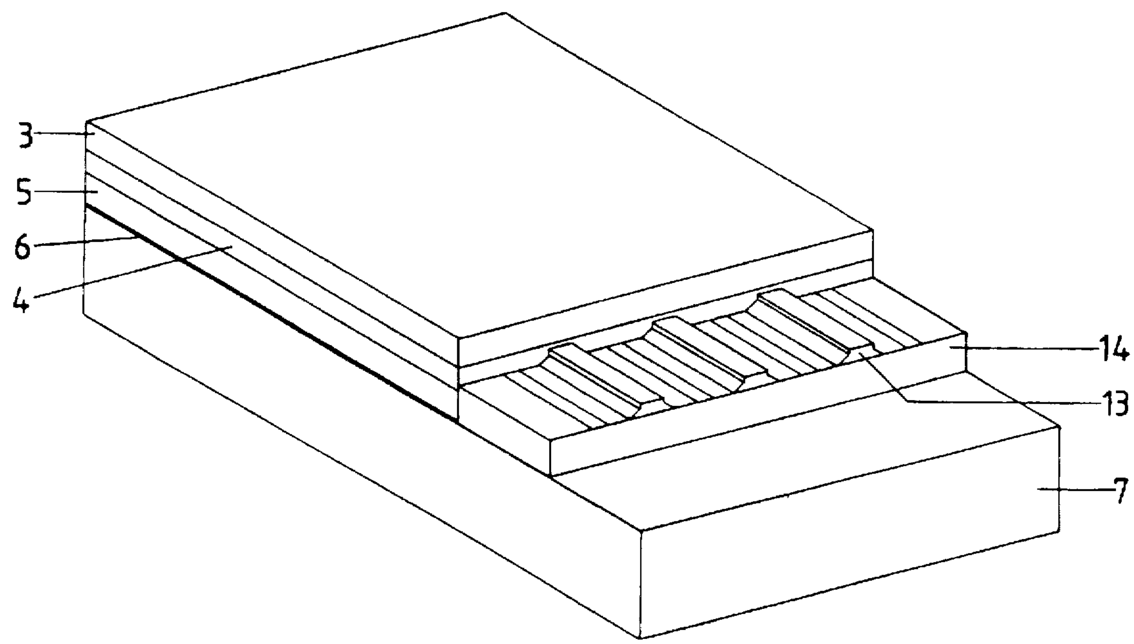

In FIG. 10 it is shown that the layer of wax (16) has been removed, and the LEDs (13) are positioned so as to be in vertical alignment with the core layer (4) of the optoboard (1).

Figure 11:
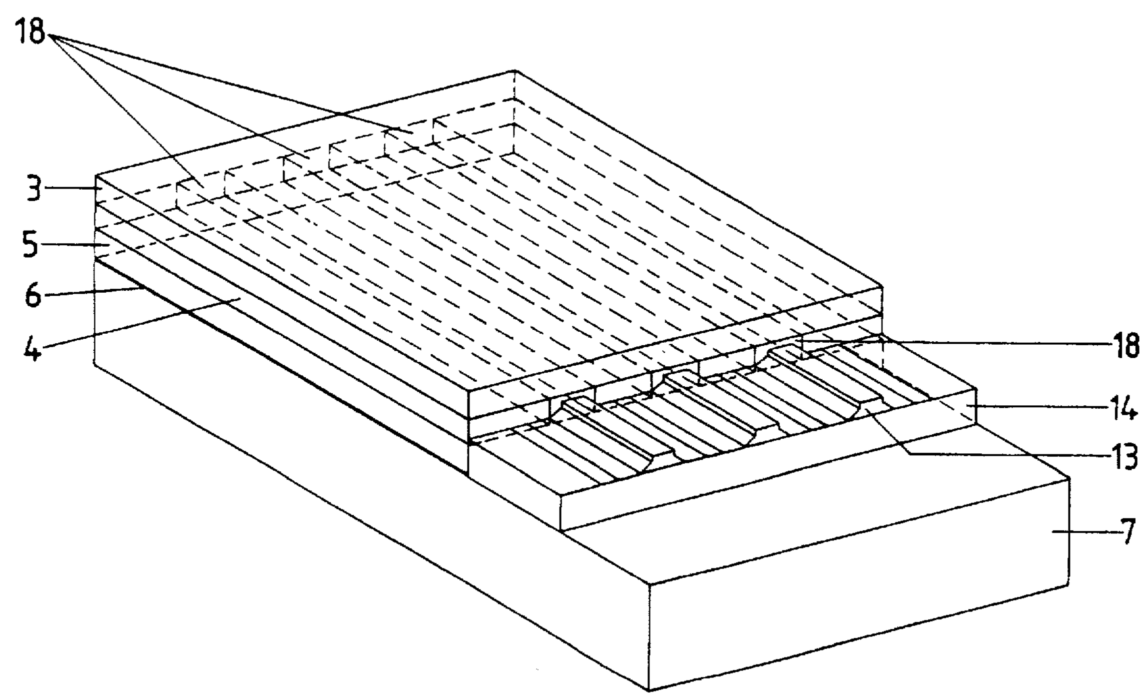
FIG. 11 is a view similar to that in FIGS. 8–10, through the top deflection layer of the optoboard, showing the core layer provided with bleached waveguide channels that are laterally aligned with the LEDs.

In FIG. 11 a view is given through the top deflection layer (3), in order to show the core layer (4) provided with bleached waveguide channels (18), which are in lateral alignment with the LEDs (13).

We claim:

1. A method of fabricating an electro-optical device in which at least one semiconductor component is integrated with at least one polymeric optical waveguide component, comprising the following steps:

making a transplantable film from a III–V component with a layer thickness in the range of from about 0.1 μm to about 10 μm;

making a guest substrate by providing a cavity into which the III–V component will fit in a polymeric waveguide structure provided on a support; and arranging the transplantable film of the III–V component in the cavity.

2. A method of fabricating an electro-optical device in which at least one semiconductor component is integrated with at least one polymeric optical waveguide component, comprising the following steps:

making a transplantable film from a III–V component with a layer thickness in the range of from about 0.1 μm to about 10 μm;

making a guest substrate by providing a cavity into which the III–V component will fit in a polymeric waveguide structure provided on a support;

arranging the transplantable film of the III–V component in the cavity; and filling any spaces between the semiconductor component and the polymeric optical waveguide component using a material.

3. An integrated electro-optical device comprising a polymeric waveguide component and a semiconductor component wherein the semiconductor component is integrated with the polymeric waveguide component by being located in a cavity therein, the polymeric waveguide component comprising a polymer in which waveguide channels have been provided by bleaching and also comprising a cavity and a waveguide structure made up of a flat core layer enclosed by a flat bottom deflection layer and a flat top deflection layer.

4. An integrated electro-optical device attainable by means of a method of fabricating said electro-optical device which comprises integrating a semiconductor component with a polymeric optical waveguide component wherein a semiconductor component obtained by epitaxial lift-off (ELO) is integrated with a waveguide device which, in addition to a polymeric optical waveguide structure which comprises a bleachable polymer in which the polymeric waveguide component is fabricated by inducing a waveguide pattern by means of a bleaching process, comprises a cavity, and where the polymeric optical waveguide component is made from the polymeric optical waveguide structure after the arrangement of the semiconductor component in the waveguide device.

5. A method of fabricating an electro-optical device comprising integrating a semiconductor component with a polymeric optical waveguide component wherein a semiconductor component obtained by epitaxial lift-off (ELO) is integrated with a waveguide device which, in addition to a polymeric optical waveguide structure which comprises a bleachable polymer in which the polymeric waveguide component is fabricated by inducing a waveguide pattern by means of a bleaching process, comprises a cavity and wherein the cavity is provided with substantially vertical walls, and where the polymeric optical waveguide component is made from the polymeric optical waveguide structure after the arrangement of the semiconductor component in the waveguide device.

6. A method of fabricating an electro-optical device comprising integrating a semiconductor component with a polymeric optical waveguide component wherein a semiconductor component obtained by epitaxial lift-off (ELO) is integrated with a waveguide device which, in addition to a polymeric optical waveguide structure which comprises a bleachable polymer in which the polymeric waveguide component is fabricated by inducing a waveguide pattern by means of a bleaching process, comprises a cavity and wherein the semiconductor component is not in direct contact with the polymeric optical waveguide component, the intermediate space being filled with a material having an index of refraction of the same order of magnitude as the polymeric optical waveguide's, and where the polymeric optical waveguide component is made from the polymeric optical waveguide structure after the arrangement of the semiconductor component in the waveguide device.

7. A method of fabricating an electro-optical device comprising integrating a semiconductor component with a polymeric optical waveguide component wherein a semiconductor component obtained by epitaxial lift-off (ELO) is integrated with a waveguide device which, in addition to a polymeric optical waveguide structure, which comprises a bleachable polymer in which the polymeric waveguide component is fabricated by inducing a waveguide pattern by means of a bleaching process, comprises a cavity, and where the polymeric optical waveguide component is made from the polymeric optical waveguide structure after the arrangement of the semiconductor component in the waveguide device.

* * * * *